UNITED STATES PATENT OFFICE.

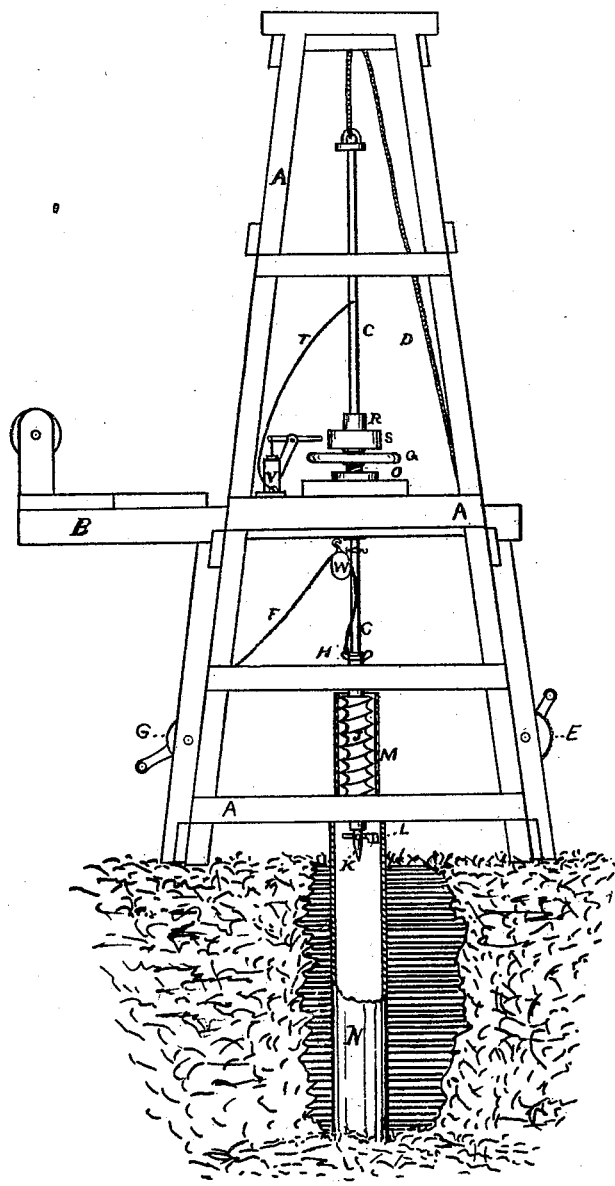

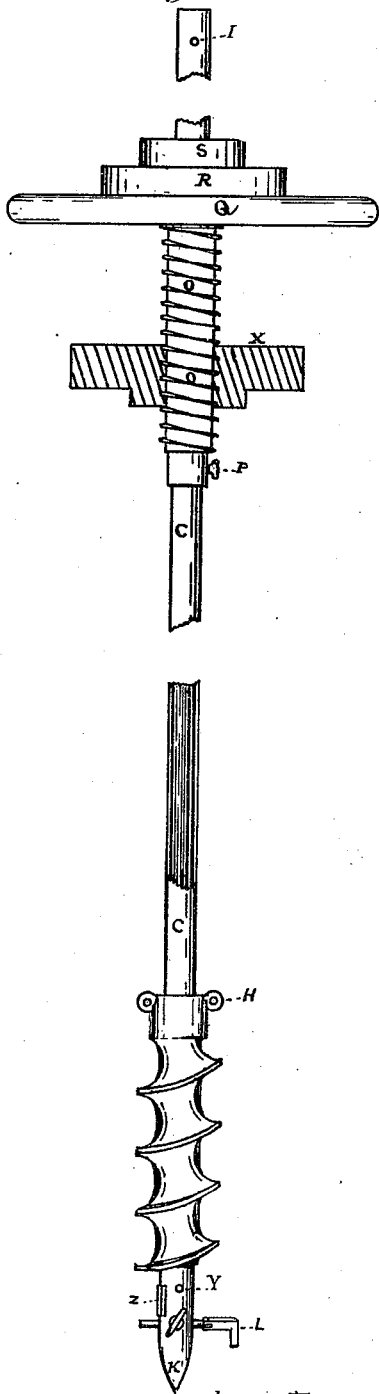

GEORGE C. PRICE AND THOMAS G. MORGAN, OF SANTA ROSA, CALIFORNIA.

IMPROVEMENT IN EARTH-BORING MACHINES.

Specification forming part of Letters Patent No. 180,268, dated July 25, 1876; application filed April 18, 1876.

*To all whom it may concern:*

Be it known that we, GEORGE C. PRICE and THOMAS G. MORGAN, of Santa Rosa, in the county of Sonoma, California, are the joint and first inventors of certain new and useful Improvements in Well-Boring Machinery, of which the following is a specification, reference being had to the accompanying drawing and the letters marked thereon.

Figure 1 is a side elevation. Fig. 2 is a section.

A represents the main frame of the derrick; B, the side platform or tender; C, the boring-shaft; D, the rope for lowering the boring-shaft; E, the drum for winding the boring-shaft rope; F, the rope to raise the auger; G, the drum to wind the rope of the auger; H, the attachment for attaching the rope F to the earth-auger; J, the auger; K, the auger-point; L, the cutting or boring bit; M, the auger-tube; N, the well-tube; O, the adjustable boring-screw; P, the set-screw, which shows one mode of attaching the boring-screw; Q, the hand-wheel; R and S, the driving-pulleys; T, the air and water hose; V, the pump; W, the snatch-block; X, the nut or female screw for the screw O to operate in; and Y is the port or opening to admit air or supply water below the auger, thus to relieve atmospheric pressure.

The following is the operation of the same: The first or lower joint of tubing (composing the hollow boring-shaft) being supplied with any suitable point, K, the auger J being placed on the shaft so as to slide up and down freely, drops down to rest above the jointed cutter L. The feather Z holds the auger and forces it to turn with the boring-shaft. The screw O is attached to the boring-shaft C, to operate in the female screw X, which is attached to the platform or tender B, and the lower end or point of the boring-shaft is lowered into the ground. Then the screw is set fast to the boring-bar by means of a set-screw, P. The hand-wheel Q or pulley R or S being revolved in a forward direction, so as to drive the screw down, the boring bar or shaft is forced into the ground the depth of one thread of the screw at each revolution of the same. By this manner a uniform feed is given to the auger. When the auger is filled it is drawn up on the shaft by means of the rope F and snatch-block W, and, when considerable force is required, the drum and crank G are employed. The auger-tube M is also raised with the auger, and holds the earth contained in the cavity of the auger, thus saving the friction of the earth, which would be caused by its impingement upon the inner surface of the well tube or curbing. It also retains the earth to be discharged by the workmen after coming to the surface or out of the curbing, which may be readily done, as it may be freely raised above the screw of the auger J. As soon as discharged the auger is again lowered by means of the rope F, and slides down upon the shaft until it reaches the feather Z, and, being revolved, the feather Z, operating in a corresponding slot in the auger J, causes the auger to turn with the shaft, (by this well-known device of the slot and feathered shaft.)

The shaft, being hollow, admits air at the bottom of the auger under the earth to prevent atmospheric pressure, and, when required, air may be forced down through the hose T by means of the pump V, or water may be supplied in case the ground is dry or the substance hard, to prevent heating of the cutter L. The cutter L is designed as an extension-bit, being adjustable in the usual way to extend far enough to cut under and outside of the curbing or well-pipe, to allow its free descent and placement. It is also jointed, to allow it to fold in when the boring-shaft is revolved backward, so that it may be drawn up inside of the well-curbing when the well is completed or the bit requires changing or sharpening.

The auger case or tube may be supplied with a door fitted to the concave of the auger, in case of wet-boring, to bring up the borings, or when using a drill in boring rock. When the boring-bar is taken out it is freed from the boring-screw O by means of the set-screw P, and then drawn up by the rope D, and taken off section by section, in the usual way.

When rock or other very hard substance is to be bored, and drills, or even the diamond drill, is used, then a compound or reacting screw must be used to retard the descent of the shaft, while the revolutions of the same are increased. This may be effected by fitting the boring-screw O to work in an outer female screw revolved in an opposite direction, or by any other well-known device for retarding the motion of the shaft downward, and still regulate a uniform feed by means of a screw.

Having thus described our invention, what we claim, and desire to secure by Letters Patent, is—

1. The well-boring machine, composed of the frame A, having the platform B, the drums E and G, and the hollow boring-shaft C, having the supply-port I and the discharge-port Y, when operated in connection with and by means of the adjustable boring-screw O and female screw X, and the hand-wheel G, pulleys R and S, the pump V and hose T, the sliding auger J, and the adjustable jointed boring-bit L, the whole being operated as and for the purposes set forth.

2. The pump V and hose T, in combination with the hollow boring-shaft C, for the purpose of supplying air or water, as and for the purposes set forth.

GEORGE C. PRICE.
THOS. G. MORGAN.

Witnesses:
JOHN H. REDSTONE,
T. L. BROMLEY.